United States Patent
Traut (10) Patent No.: US 8,327,353 B2
(45) Date of Patent: Dec. 4, 2012

(54) HIERARCHICAL VIRTUALIZATION WITH A MULTI-LEVEL VIRTUALIZATION MECHANISM

(75) Inventor: Eric P. Traut, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1089 days.

(21) Appl. No.: 11/215,380

(22) Filed: Aug. 30, 2005

(65) Prior Publication Data
US 2007/0050764 A1 Mar. 1, 2007

(51) Int. Cl.
G06F 9/455 (2006.01)

(52) U.S. Cl. .......................................................... 718/1

(58) Field of Classification Search .............. 718/1, 100; 707/205
See application file for complete search history.

(56) References Cited

U.S. PATENT DOCUMENTS

| | | | |
|---|---|---|---|
| 4,253,145 A | 2/1981 | Goldberg | |
| 4,787,031 A | 11/1988 | Karger et al. | |
| 5,325,526 A * | 6/1994 | Cameron et al. | 718/102 |
| 5,946,487 A * | 8/1999 | Dangelo | 717/148 |
| 6,141,732 A | 10/2000 | Adams | |
| 6,282,701 B1 | 8/2001 | Wygodny et al. | |
| 6,633,916 B2 | 10/2003 | Kauffman | |
| 6,725,284 B2 | 4/2004 | Arndt | |
| 6,934,888 B2 * | 8/2005 | McIntosh et al. | 714/43 |
| 6,961,941 B1 * | 11/2005 | Nelson et al. | 719/319 |
| 7,035,963 B2 | 4/2006 | Neiger et al. | |
| 7,140,015 B1 * | 11/2006 | Bhanjois et al. | 718/100 |
| 7,146,482 B2 * | 12/2006 | Craddock et al. | 711/200 |
| 7,197,585 B2 * | 3/2007 | Farrell et al. | 710/200 |
| 7,234,037 B2 * | 6/2007 | Errickson et al. | 711/202 |
| 7,249,208 B2 * | 7/2007 | Aslot et al. | 710/104 |
| 7,356,679 B1 * | 4/2008 | Le et al. | 713/1 |
| 7,376,948 B2 * | 5/2008 | Armstrong et al. | 718/1 |
| 7,406,522 B2 * | 7/2008 | Riddle | 709/226 |
| 7,412,702 B1 * | 8/2008 | Nelson et al. | 718/1 |
| 7,421,533 B2 * | 9/2008 | Zimmer et al. | 711/6 |
| 7,443,878 B2 * | 10/2008 | Hendel et al. | 370/463 |
| 7,467,381 B2 * | 12/2008 | Madukkarumukumana et al. | 718/1 |
| 7,478,388 B1 * | 1/2009 | Chen et al. | 718/1 |

(Continued)

FOREIGN PATENT DOCUMENTS
EP 170259 A2 9/2006

(Continued)

OTHER PUBLICATIONS

IBM, "Virtual management machine manager, integrated physical and virtual systems management" http://www-1.ibm.com/servers/eserver/xseries/systems_management/xseries_sm/vmm.html, 2 pages.

(Continued)

*Primary Examiner* — Emerson Puente
*Assistant Examiner* — Adam Lee
(74) *Attorney, Agent, or Firm* — Woodcock Washburn LLP (57) ABSTRACT

Hierarchical virtualization is disclosed, where such virtualization can be accomplished with a multi-level mechanism. The hierarchical virtualization includes using a hypervisor that maintains a first partition and using a virtualization stack within the first partition to create and control a second partition. Multiple virtualization stacks can subsist within the first partition, and each such virtualization stack can create and control multiple partitions. In one particular implementation, a child partition can have exclusive control over a portion or all of its resources with respect to a parent partition. The hypervisor as the ultimate arbiter in such a virtualized environment enforces such a setup and is able to communicate directly within any partition within the virtualized hierarchy.

20 Claims, 11 Drawing Sheets

U.S. PATENT DOCUMENTS

| | | | |
|---|---|---|---|
| 7,562,179 | B2 | 7/2009 | Brandt et al. |
| 7,685,635 | B2 | 3/2010 | Vega et al. |
| 7,853,960 | B1 * | 12/2010 | Agesen et al. ............... 719/324 |
| 2003/0009648 | A1 | 1/2003 | Doing et al. |
| 2003/0037089 | A1 * | 2/2003 | Cota-Robles et al. ............ 709/1 |
| 2003/0061254 | A1 | 3/2003 | Lindwer et al. |
| 2003/0110205 | A1 | 6/2003 | Johnson |
| 2003/0120856 | A1 | 6/2003 | Neiger et al. |
| 2003/0229794 | A1 * | 12/2003 | Sutton et al. .................. 713/189 |
| 2004/0064668 | A1 | 4/2004 | Kjos et al. |
| 2004/0117532 | A1 | 6/2004 | Bennett et al. |
| 2004/0139437 | A1 | 7/2004 | Arndt |
| 2004/0205272 | A1 | 10/2004 | Armstrong et al. |
| 2005/0044301 | A1 | 2/2005 | Vasilevsky et al. |
| 2005/0076324 | A1 | 4/2005 | Lowell et al. |
| 2005/0091022 | A1 | 4/2005 | Levit-Gurevich et al. |
| 2005/0091029 | A1 | 4/2005 | Traut |
| 2005/0091365 | A1 | 4/2005 | Lowell et al. |
| 2005/0132365 | A1 | 6/2005 | Madukkarumukumana et al. |
| 2006/0070066 | A1 * | 3/2006 | Grobman .......................... 718/1 |
| 2006/0101224 | A1 * | 5/2006 | Shah et al. .................... 711/173 |
| 2006/0130060 | A1 * | 6/2006 | Anderson et al. ................. 718/1 |
| 2006/0206892 | A1 * | 9/2006 | Vega et al. ........................ 718/1 |
| 2006/0242229 | A1 * | 10/2006 | Kinsey et al. ................. 709/203 |
| 2006/0242641 | A1 | 10/2006 | Kinsey et al. |
| 2006/0251072 | A1 * | 11/2006 | Hendel et al. ................. 370/392 |
| 2007/0006226 | A1 * | 1/2007 | Hendel ............................. 718/1 |
| 2007/0016904 | A1 * | 1/2007 | Adlung et al. .................... 718/1 |
| 2007/0028238 | A1 * | 2/2007 | Bennett et al. ................... 718/1 |
| 2007/0028244 | A1 * | 2/2007 | Landis et al. ................. 718/108 |
| 2007/0067366 | A1 * | 3/2007 | Landis .......................... 707/205 |

FOREIGN PATENT DOCUMENTS

| | | | |
|---|---|---|---|
| EP | 170259 | A3 | 1/2008 |
| JP | 62-221041 | A | 9/1987 |
| JP | 02-019937 | | 1/1990 |
| JP | 2-239334 | A | 9/1990 |
| JP | 3-100833 | A | 4/1991 |
| JP | 9-81401 | A | 3/1997 |
| JP | 9-282196 | A | 10/1997 |
| JP | 2001-318797 | A | 11/2001 |
| JP | 2007-505402 | A | 3/2007 |
| JP | 2008-508598 | A | 3/2008 |
| RU | 99122746 | A | 9/2001 |
| RU | 2003123112 | A | 2/2005 |
| RU | 2259582 | C2 | 8/2005 |
| WO | WO 98/44411 | A1 | 10/1998 |
| WO | WO 03/052542 | A1 | 1/2003 |
| WO | WO 2004/095272 | A1 | 11/2004 |
| WO | WO 2005/015390 | A1 | 2/2005 |
| WO | WO 2005/029326 | A1 | 3/2005 |
| WO | WO 2005/036405 | A1 | 4/2005 |
| WO | WO 2005/036806 | A2 | 4/2005 |
| WO | WO 2005/062178 | A2 | 7/2005 |

OTHER PUBLICATIONS

Intel Research Cambridge, "Xen and the art of virtual channel processing," http://www.intel.com/research/network/cambridge_collab_p2.htm#xen, 5 pages.

Trango, "The real-time embedded hypervisor; Products (features)," http://www.trango-systems.com/english/frameset_en.html, 1 page.

VMware VirtualCenter1.2, "What is VMware VirtualCenter?," http://www.vmware.com/products/vmanage/vc_features.html, 2 pages.

Barham et al., "Xen 2002", Technical Report, University of Cambridge, Computer Laboratory, Jan. 9, 2003 (553), 1-86.

Barham et al., "Xen and the Art of Virtualization", Proceedings of the nineteenth ACM symposium on Operating systems principles, Oct. 19-23, 2003, 164-177.

Xen, "Xen Users' Manual", Xen v3.0, May 1, 2008, 1-81.

EP Application No. 06110963: Extended European Search Report, Dec. 19, 2007.

EP Application No. 06802600: Extended European Search Report, Dec. 8, 2008.

"Virtual Machine Systems entering into actual practical use because of performance enhancement", NIKKEI COMPUTER, NIKKEI McGraw-Hill, Issue of Jul. 23, 1984 (No. 74), pp. 63-82, Jul. 23, 1984, ISSN:0285-4619.

Hidenori Umeno, (and 4 others), "Performance Improvement Methods for Virtual Machine System", Information Processing, Information Processing Society of Japan, vol. 31, No. 12, pp. 1665-1680, Dec. 15, 1990, ISSN:0447-8053.

Hidenori Umeno, (and 2 others), "Development and Evaluation of New Methods for Scheduling Logical Processors in Virtual Machine Systems", Journal of Information Processing Society of Japan, Information Processing Society of Japan, vol. 44, No. 3, pp. 868-882, Mar. 15, 2003, ISSN:0387-5806 [English Abstract Included].

Notice of Allowance for Japanese Patent Application No. 2006-067701, Aug. 24, 2012, 7 pages.

* cited by examiner

HIERARCHICAL VIRTUALIZATION WITH A MULTI-LEVEL VIRTUALIZATION MECHANISM

CROSS-REFERENCE TO RELATED APPLICATIONS

The present application is related to application Ser. No. 11/078,141, filed Mar. 11, 2005, entitled "SYSTEMS AND METHODS FOR MULTI-LEVEL INTERCEPT PROCESSING IN A VIRTUAL MACHINE ENVIRONMENT."

TECHNICAL FIELD

The present disclosure generally relates to the field computing. More specifically, it relates to computer virtualization.

BACKGROUND

The notion of virtualization entails the virtualizing of computer hardware such that multiple operating systems, each of which may be contained in a separate partition, can run on a single piece of hardware. Virtualizing software abstracts the hardware in various ways such that diverse operating systems interact with the software, and the software in turn interacts with the hardware.

Most virtualization systems contain a single Virtual Machine Monitor (VMM) software. In some arrangements, this VMM is called a "hypervisor." A hypervisor is designed to run directly on hardware. As such, it is the ultimate arbiter of how the hardware is used. For this reason, in the general case, there can be only one hypervisor on a machine (on one set of hardware). A hypervisor allows multiple "guest" operating systems (OSs) or "guests" for short, to run on a system concurrently.

A VMM or hypervisor can be designed with certain goals in mind. Engineers must make trade-offs between security, complexity, flexibility, performance, and so on. Some VMMs or hypervisors allow interaction with the guests through a programmatic interface. As with any interface, versioning becomes important. A guest written for one version of a hypervisor may be incompatible with a different version of the hypervisor.

Thus, there are situations where it would be useful to run multiple copies of a hypervisor on a single machine. One version, for example, could be extremely simple and provide high security guarantees, and another version could provide more complex and intricate features. Such multiple versions could run side-by-side.

Unfortunately, this is not feasible with today's designs because there can be only one hypervisor on the machine. One traditional approach to this problem is to use recursive virtualization whereby hypervisors are "nested." A single "real" hypervisor sits at the base, and one or more second-level hypervisors run above it. This arrangement has the disadvantage of poor performance. Because the second-level hypervisors were written assuming they have direct access to the hardware, they will not perform as well. In short, with each additional level of nested hypervisors, the performance of the overall virtualized system becomes geometrically worse off.

Also, many processors provide hardware support for one level of virtualization, but they rarely provide support for more than one. Thus, from a hardware point of view, it becomes difficult to implement multiple hypervisors on a single physical machine. Thus, it would be advantageous to provide mechanisms for running virtualizing software directly on hardware such that multiple versions of the software are running directly on the hardware at the same time.

SUMMARY

The subject matter disclosed in the present application concerns hierarchical virtualization with a multi-level virtualization mechanism. In one example, a method for providing such virtualization is used, where a first partition is maintained with a hypervisor. A first virtualization stack within the first partition interacts with a second partition, for instance, by creating the second partition in the first place and allocating its resources. The hypervisor in such a hierarchical arrangement of the partitions, where a virtualization stack in one partition controls another partition, is actually aware of each partition and can directly communicate with each partition. Because it can communicate with each partition, the hypervisor can also enumerate any resources within any given partition.

Furthermore, the second partition can add on to the hierarchical relationship of the partitions by creating a third partition using its own second virtualization stack. Additionally, a third virtualization stack within the first partition can co-exist side-by-side with the first virtualization stack, where this latter third virtualization stack can create a fourth partition that is independent from the previously mentioned first, second, and third partitions. Alternatively, the first virtualization stack can create the fourth partition since a virtualization stack can create and control more than one partition at any given time.

In another example of the disclosure, security of the hierarchical virtualization is discussed. Thus, a parent partition is provided, and this parent partition has a virtualization stack. A child partition is created by the virtualization stack within the parent partition, however, the child partition is not completely under the control of the parent because it has at least one resource (or portion thereof) exclusively under its own control. For security reasons, a child partition may not trust its parent partition, and if that is the case, certain resources in the child are not attainable by the parent. In order to implement this emancipation of the child from the parent partition, the child partition asks the parent partition for exclusive control of resources and other objects, and the hypervisor, as the ultimate arbiter in this virtualized environment, makes sure the parent partition complies with the child partition's requests.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION

Overview

The description provided below first starts off with a general and brief discussion of virtual machines. Next, it shifts its focus to a discussion of hierarchical virtualization with a multi-level virtualization mechanism. Relevant aspects of hierarchical virtualization are discussed, where one partition maintained by a hypervisor and a virtualization stack contained therein can create and control another partition; or alternatively, it can have more than one virtualization stack that can create and control further partitions. In either case, the hypervisor can directly communicate with each partition in the hierarchy because it is aware of each partition in the first place. Lastly, the mechanism that allows for hierarchical virtualization is discussed piece-by-piece, by first breaking it up into a hypervisor microkernel and a virtualization stack. Each of the elements and components of these two pieces, in turn, is further discussed in more detail.

Virtual Machines

Figure 1:
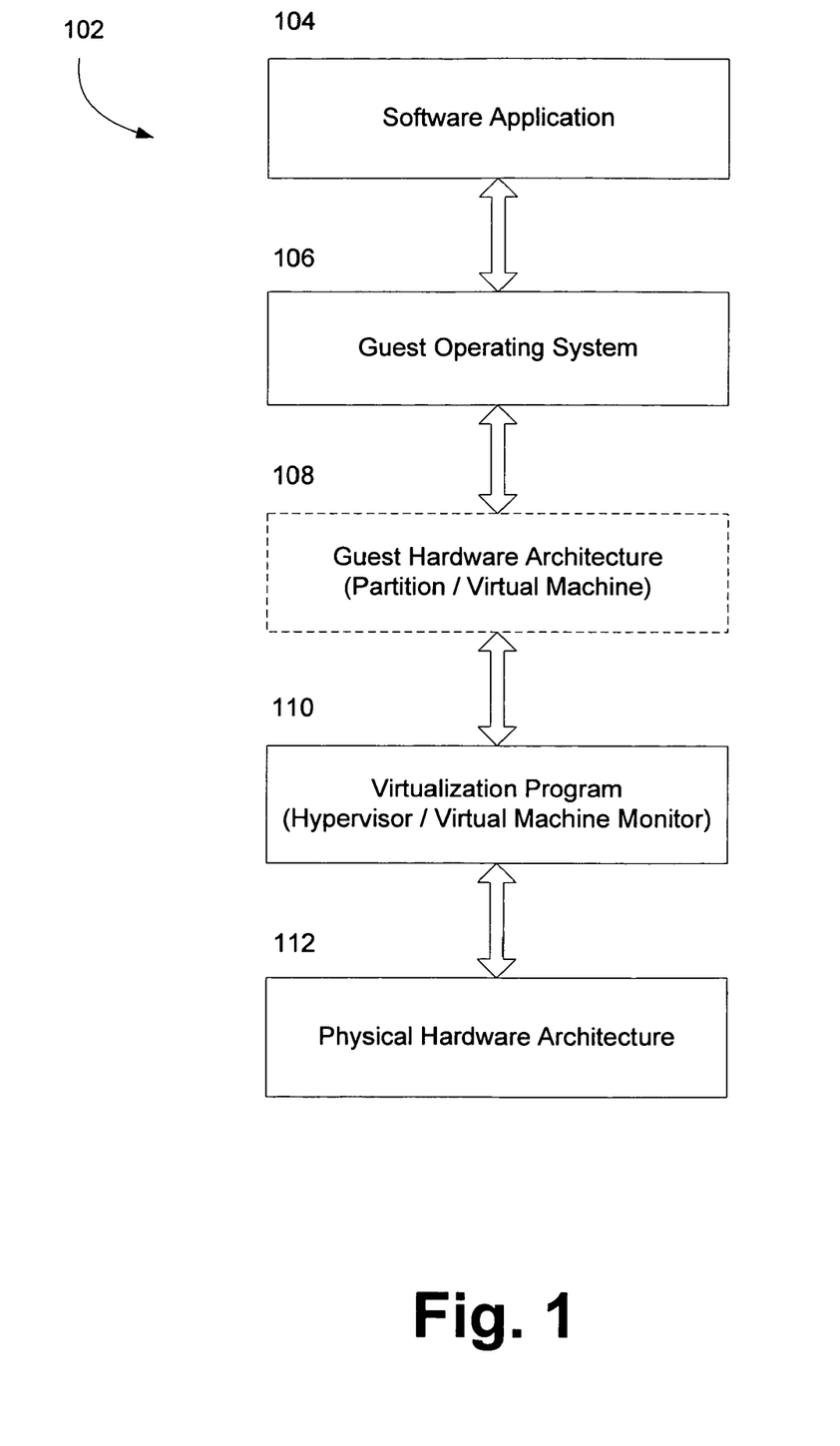
FIG. 1 is a block diagram representing the logical layering of the hardware and software architecture for virtualized operating environment in a computer system.

FIG. 1 is a diagram representing the logical layering of the hardware and software architecture for a virtualized environment in a computer system. In the figure, a virtualization program 110 runs directly or indirectly on the physical hardware architecture 112. The virtualization program 110 may be (a) a virtual machine monitor that runs alongside a host operating system or a host operating system with a hypervisor component wherein the hypervisor component performs the virtualization. The virtualization program 110 virtualizes a guest hardware architecture 108 (shown as dashed lines to illustrate the fact that this component is a partition or a "virtual machine"), that is, hardware that does not actually exist but is instead virtualized by the virtualizing program 110. A guest operating system 106 executes on the guest hardware architecture 108, and a software application 104 runs on the guest operating system 106. In the virtualized operating environment of FIG. 1, the software application 104 can run in a computer system 102 even if the software application 104 is designed to run on an operating system that is generally incompatible with a host operating system and the hardware architecture 112.

Figure 2A:
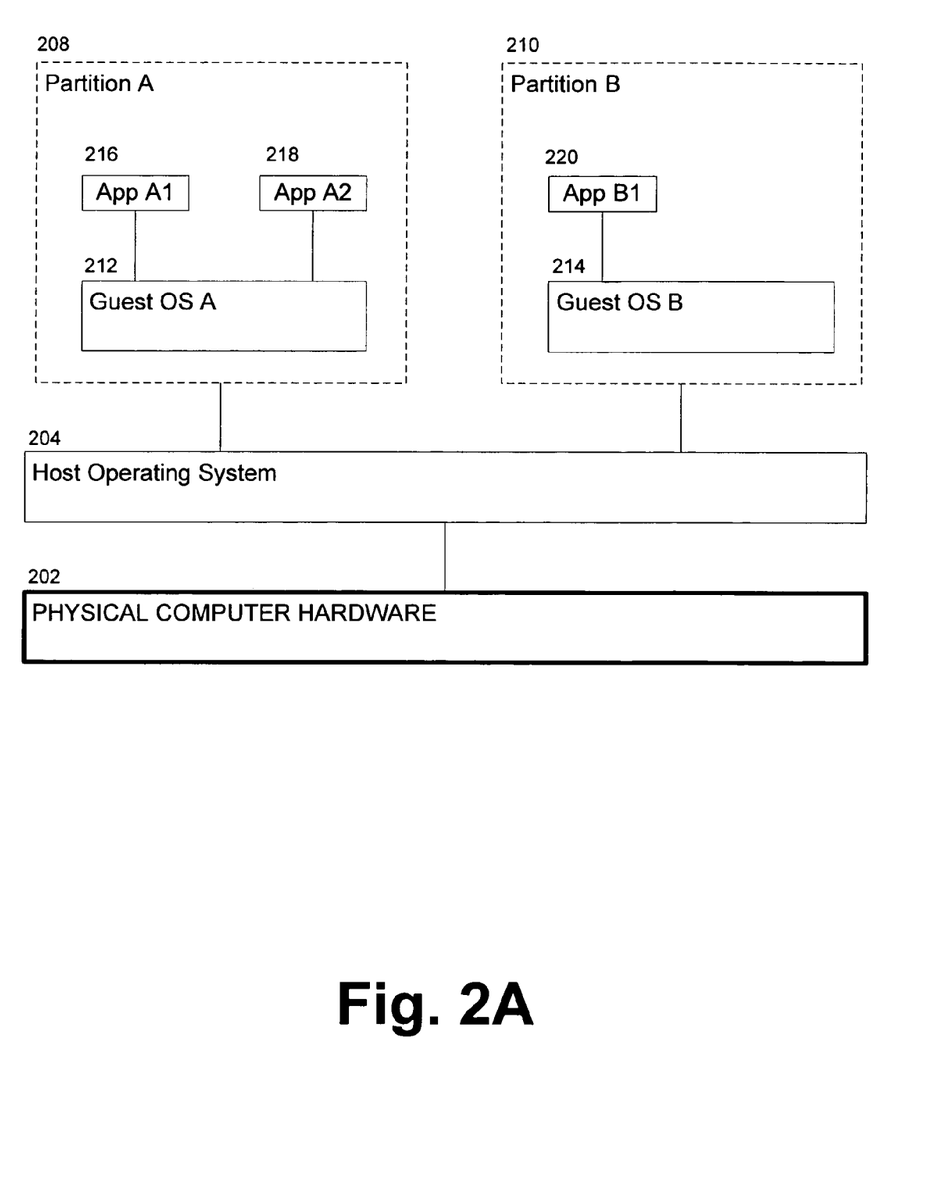
FIG. 2A is a block diagram representing a virtualized computing system wherein the virtualization is performed by the host operating system (either directly or via a hypervisor)

FIG. 2A illustrates a virtualized computing system comprising a host operating system (host OS) software layer 204 running directly above physical computer hardware 202, where the host OS 204 provides access to the resources of the physical computer hardware 202 by exposing interfaces to partitions A 208 and B 210 for the use by operating systems 212 and 214, respectively. This enables the host OS 204 to go unnoticed by operating system layers 212 and 214 running above it. Again, to perform the virtualization, the host OS 204 may be a specially designed operating system with native virtualization capabilities or, alternately, it may be a standard operating system with an incorporated hypervisor component for performing the virtualization (not shown).

Referring again to FIG. 2A, above the host OS 204 are two partitions, partition A 208, which may be, for example, a virtualized Intel 386 processor, and partition B 210, which may be, for example, a virtualized version of one of the Motorola 680X0 family of processors. Within each partition 208 and 210 are guest operating systems (guest OSs) A 212 and B 214, respectively. Running on top of guest OS A 212 are two applications, application A1 216 and application A2 218, and running on top of guest OS B 214 is application B1 220.

In regard to FIG. 2A, it is important to note that partition A 208 and partition B 214 (which are shown in dashed lines) are virtualized computer hardware representations that exist only as software constructions. They are made possible due to the execution of specialized virtualization software(s) that not only presents partition A 208 and partition B 210 to Guest OS A 212 and Guest OS B 214, respectively, but which also performs all of the software steps necessary for Guest OS A 212 and Guest OS B 214 to indirectly interact with the real physical computer hardware 202.

Figure 2B:
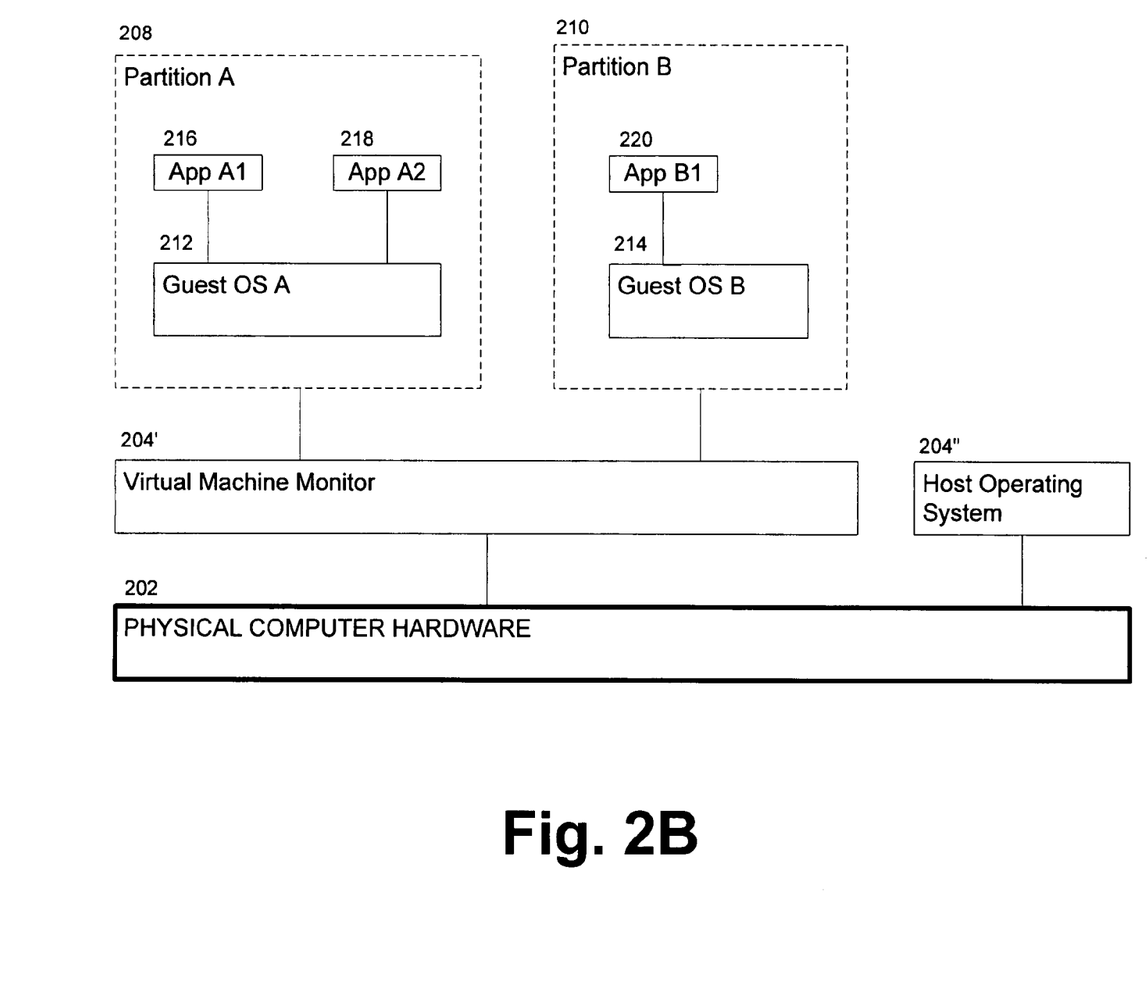
FIG. 2B is a block diagram representing an alternative virtualized computing system wherein the virtualization is performed by a virtual machine monitor running side-by-side with a host operating system.

FIG. 2B illustrates an alternative virtualized computing system wherein the virtualization is performed by a virtual machine monitor (VMM) 204' running alongside the host operating system 204". In certain cases, the VMM 204' may be an application running above the host operating system 204" and interacting with the computer hardware 202 only through the host operating system 204". In other cases, as shown in FIG. 2B, the VMM 204' may instead comprise a partially independent software system that on some levels interacts indirectly with the computer hardware 202 via the host operating system 204" but on other levels the VMM 204' interacts directly with the computer hardware 202 (similar to the way the host operating system interacts directly with the computer hardware). And yet in other cases, the VMM 204' may comprise a fully independent software system that on all levels interacts directly with the computer hardware 202 (similar to the way the host operating system interacts directly with the computer hardware) without utilizing the host operating system 204" (although still interacting with the host operating system 204" in order to coordinate use of the computer hardware 202 and avoid conflicts and the like).

All of these variations for implementing the above mentioned partitions are just exemplary implementations, and nothing herein should be interpreted as limiting the disclosure to any particular virtualization aspect.

Hierarchical Virtualization with a Multi-Level Virtual Machine Monitor

Hierarchical virtualization can be accomplished with a multi-level virtualization mechanism in the form of a virtual machine monitor (VMM) or a hypervisor. For example, the functionality provided traditionally through the use of a monolithic hypervisor can be split into a microkernel that runs directly on hardware and a virtualization stack that operates within a partition. This kind of multi-level architecture allows for hierarchical virtualization in that a virtualization stack within a partition can create and control (or "maintain," in short) other partitions, and these partitions can in turn contain other virtualization stacks that can maintain still other partitions. Importantly, this kind of architecture is distinct from a typical "nested" recursive virtualization and improves on the performance thereof.

Figure 3:
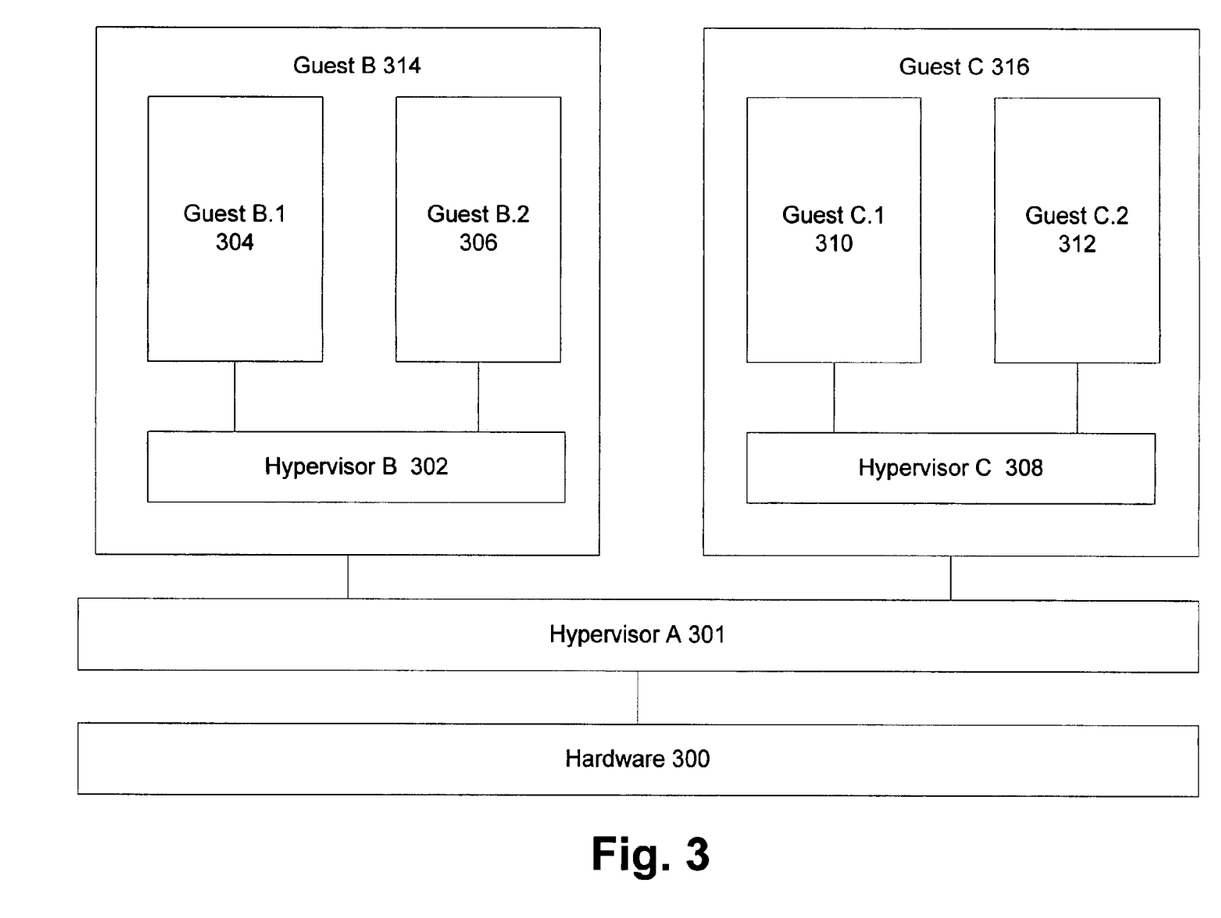
FIG. 3 illustrates one type of virtualization with nested hypervisors and partitions.

FIG. 3 illustrates, by way of contrast to hierarchical virtualization with a multi-level virtualization mechanism, recursive virtualization. In recursive virtualization, hypervisors are "nested". A single "real" hypervisor sits at the base, and one or more second-level hypervisors run above it. For example, in FIG. 3, a "real" hypervisor A 301 sits on top of the hardware 300 of a machine. Hypervisors B 302 and C 308 are nested within guest partitions B 314 and C 316, where the guest partitions B 314 and C 316 are maintained by the "real" hypervisor A 301.

The nested hypervisors B 302 and C 308 can each maintain their own guest partitions. For instance, hypervisor B 302 maintains a guest partition B.1 304 and guest partition B.2 306. Likewise, hypervisor C 308 maintains a guest partition C.1 310 and guest partition C.2 312. Although it is not illustrated so in FIG. 3, it is understood by those skilled in the art, that guest partitions B.1 304, B.2 306, C.1 310 and C.2 312, within guest partitions B 314 and B 316, can host further nested hypervisors. And these further nested hypervisors can maintain further nested partitions, and so on.

This recursive arrangement, however, has the disadvantage of poor performance. Because the second-level (and all higher level) hypervisors were written assuming they have direct access to the hardware, they will not perform well. Also, many processors provide hardware support for one level of virtualization, but they rarely provide support for more than one. Lastly, in such a nested set-up, no hypervisor is aware of all the partitions nor can it communicate directly (e.g. via hypercalls) with all the partitions. For example, if hypervisor A 301 wants to communicate with guest B.1 304, it must go through hypervisor B 302, which is very inefficient.

Figure 4A:
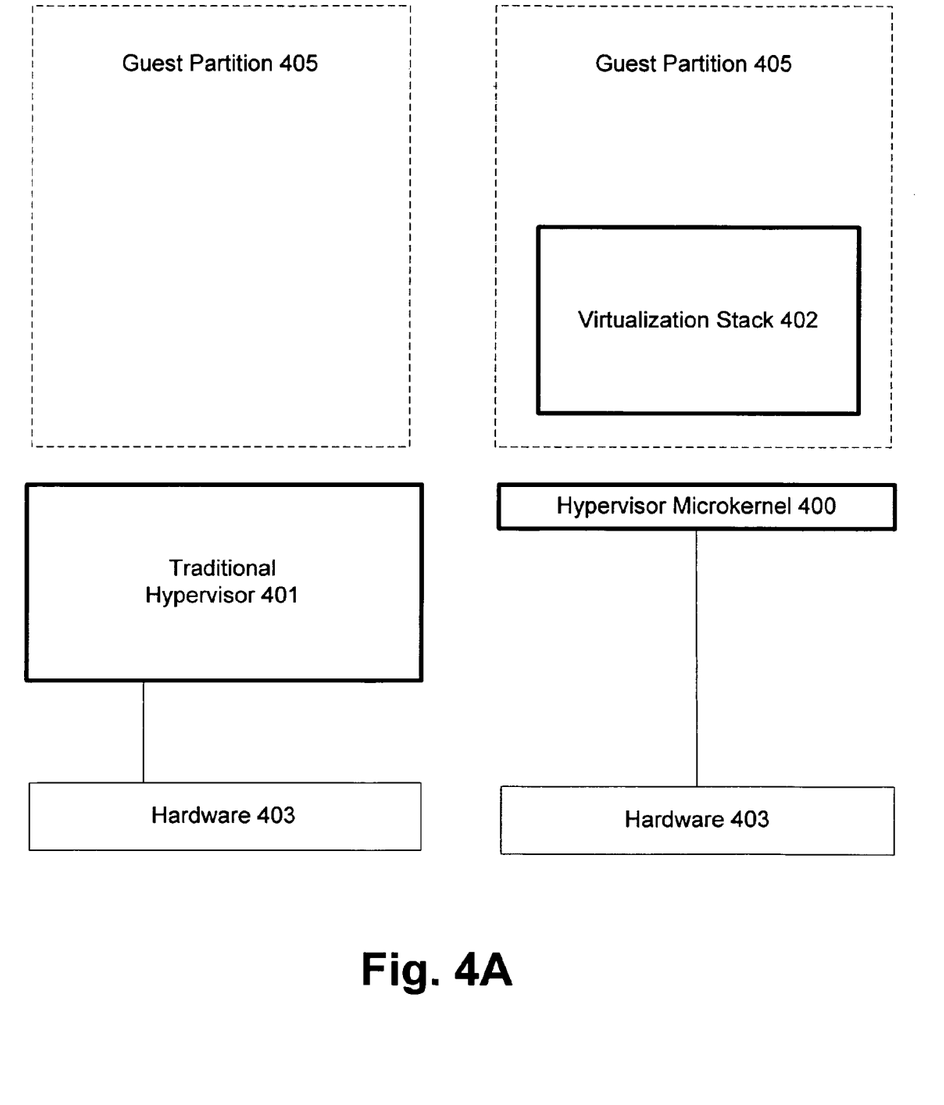
FIG. 4A illustrates hierarchical virtualization with a multi-level virtualization mechanism which obviates the need for using nested hypervisors.
Figure 4B:
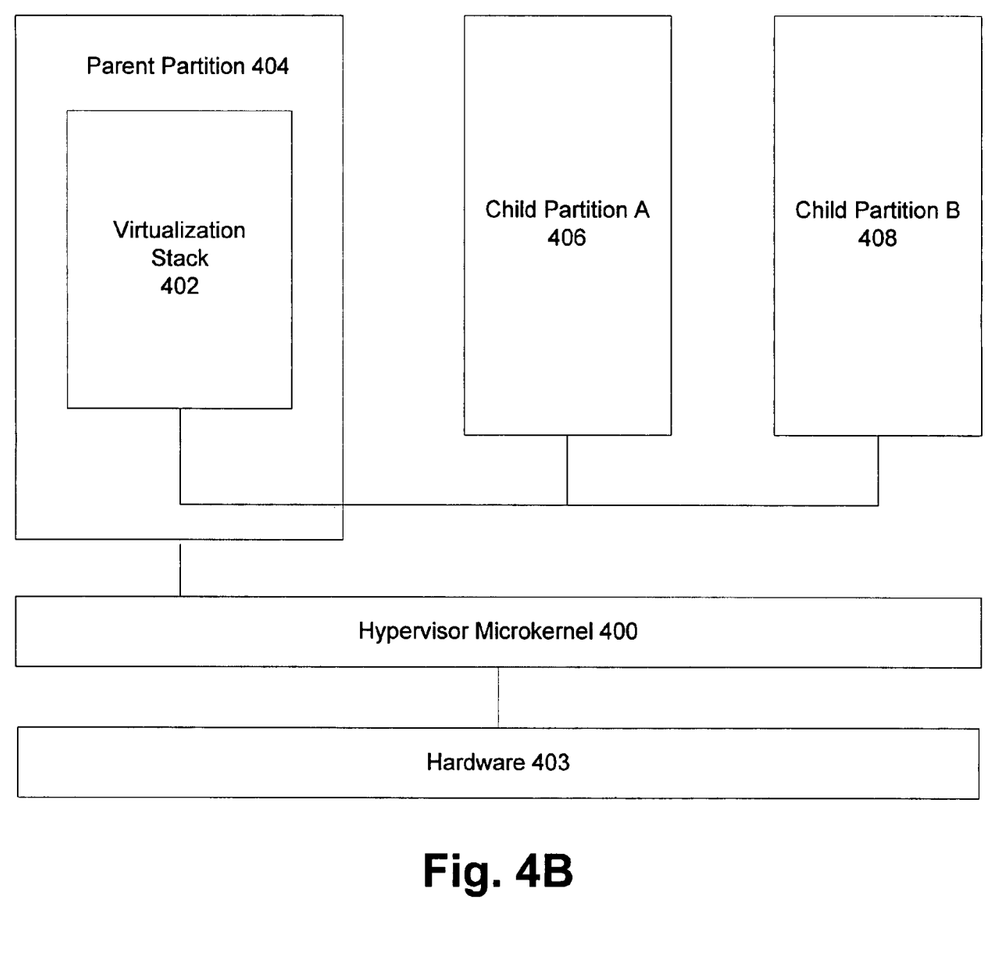
FIG. 4B provides a bird's eye view of how the microkernelized hypervisor and virtualization stack fit within an exemplary implementation.

In contrast to FIG. 3, FIGS. 4A and 4B illustrate hierarchical virtualization with a multi-level virtualization mechanism which obviates the need for using nested hypervisors. Thus, FIG. 4A depicts a hypervisor with split functionality (operating on multiple levels) vis-à-vis a traditional hypervisor. On the left of FIG. 4A is a traditional hypervisor 405 setup, and on the right is the setup disclosed herein, where a hypervisor is split into a virtualization stack 402 and a hypervisor microkernel 400.

The microkernel 400 is very small and simple and it interacts with the hardware 403. It only provides the most basic services required to partition a machine's resources. The more complex portions of the hypervisor 401 are "pushed out" to any selected guest partition 405 in the form of a virtualization stack 402. The virtualization stack 402 deals with behavior like device virtualization, paging, partition creation, configuration, and so on.

FIG. 4B provides a bird's eye view of how the microkernelized hypervisor and virtualization stack fit in a typical virtualization environment. Thus, in one aspect of the present disclosure, the hypervisor microkernel 400 sits directly on top of physical machine hardware 403, and the associated virtualization stack 1 402 of the hypervisor microkernel 400 is pushed out to a parent partition 404. The virtualization stack 402, in turn, is capable of maintaining its own partitions. In FIG. 4B, the virtualization stack 402 maintains child partition A 406 and a child partition B 408.

Interestingly, from a security point of view, child partitions may actually distrust their parent partitions even though parent partitions typically control child partitions. Because a parent partition by default has control of a child partition, it can manage the resources within a child partition. If malicious software ever infiltrated a parent partition, the child partition would be susceptible to the malicious software. For this reason, in another aspect of the present disclosure, a child partition can ask its parent partition to be emancipated or set free from the control of a parent partition. Such emancipation entails the parent partition relinquishing control over the child partition's resources (such as memory pages) and having the parent partition uninstall any of its intercepts (which may provide the parent partition with information related to content within the child partition).

Figure 4C:
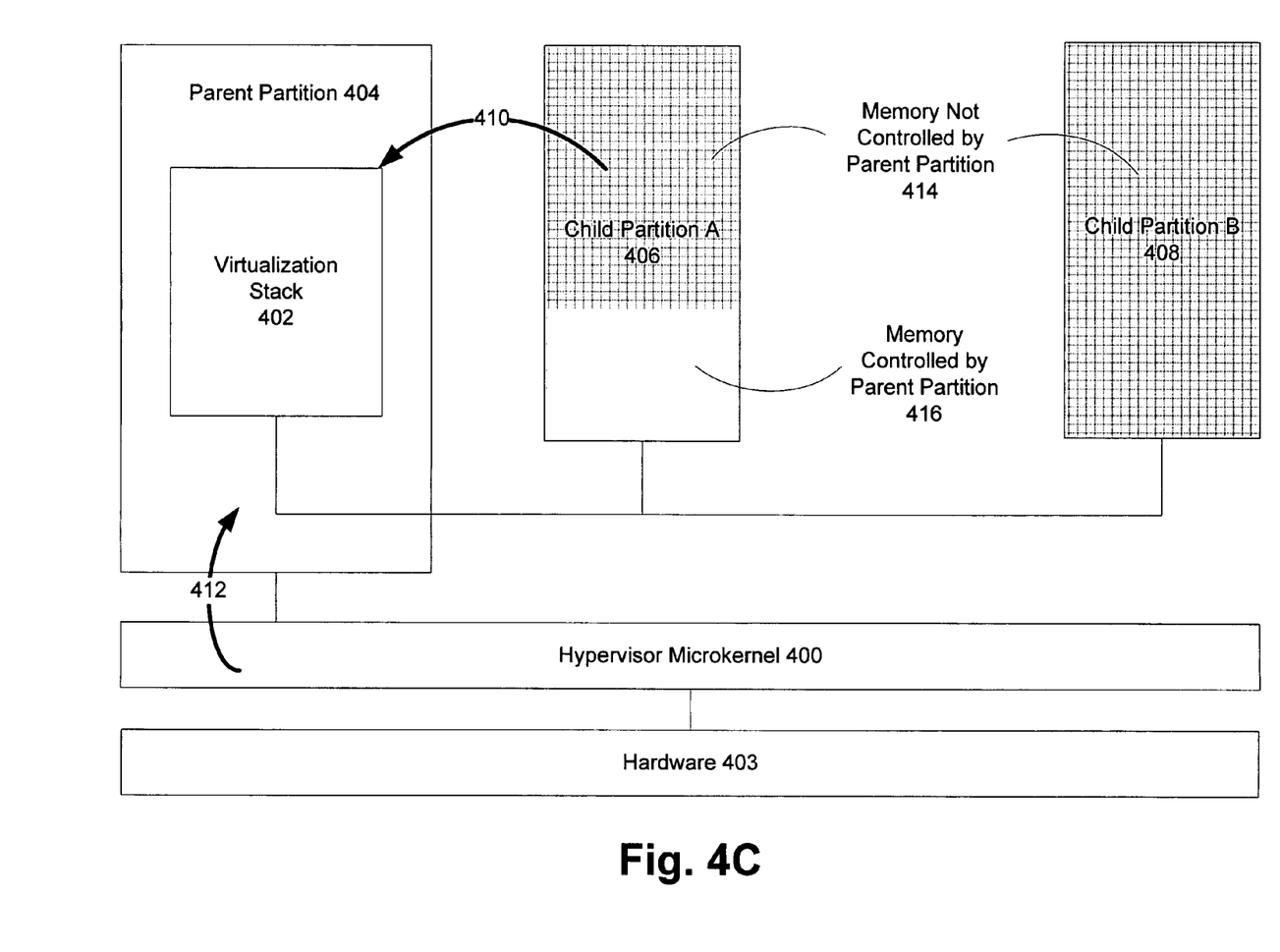
FIG. 4C illustrates a scenario where a child partition asks a parent partition for exclusive control of its own resources.

Thus, FIG. 4C illustrates a scenario where a child partition A 406 asks 410 a parent partition 404 to be emancipated. A designated component within the virtualization stack processes this request. Typically, what may happen is that the request is made by an operating system (i.e., the kernel of the OS) in the child partition A 406 or some kind of a driver in the child partition A 406, and this request may be made to a boot loader within the parent partition 404. The boot loader may be an enlightened boot loader (i.e., a boot loader aware of virtualization). In this way, the parent partition 404 may close the door on any tampering with the child partition A 406, since when the child partition A 406 becomes emancipated it cannot be hacked via the parent partition 404.

The hypervisor 400 actually enforces 412 this request, since it is the ultimate arbiter in any virtualized system. In FIG. 4C, by way of example, a portion of the memory of the child partition A 406 is not accessible 414 by the parent partition 404. Thus, the parent partition 404 cannot access the resources of the child partition A 406. Yet, the parent partition 404 may have access 416 to other portions of the child partition A 406.

In the same vein, the entire child partition B 408 is not accessible 414 by the parent partition 404, and therefore the parent partition 404 is fully distrusted, thereby making the child partition B 408 very secure. This means that the parent partition 404 cannot know anything about the child partition B 408. Interestingly enough, in some aspects of the present disclosure, the parent partition 404 despite it's limited (or non-existent) control over a fully emancipated partition, such as partition B 408, still has the ability as a parent partition 404 to terminate the child partition B 408 if the child partition behaves in an inappropriate or unexpected manner.

Figure 5:
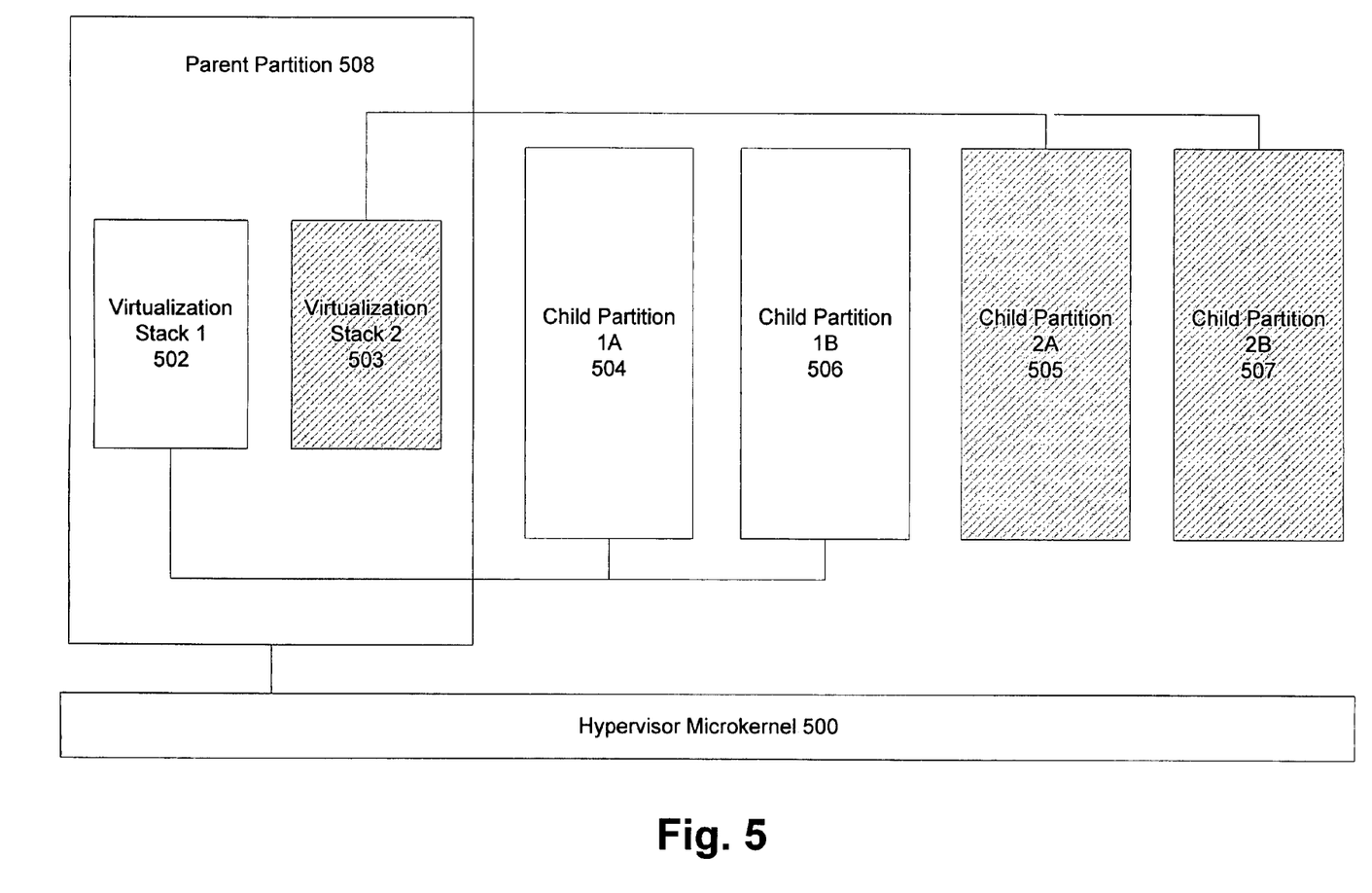
FIG. 5 illustrates the notion that multiple virtualization stacks can reside in one partition.

In yet another aspect of the present disclosure, FIG. 5 illustrates the notion that multiple virtualization stacks can reside in one partition. For example, a first virtualization stack 1 502 can reside in a parent partition 508 alongside a second virtualization stack 2 503. The first virtualization stack 1 502 is capable of maintaining multiple child partitions (with respect to the parent partition that it is residing in). Thus, virtualization stack 1 502 maintains child partition 1A 504 and child partition 1B 506. Likewise, virtualization stack 2 503 maintains child partition 2A 505 and child partition 2B. Although only two virtualization stacks are illustrated, any number of virtualization stacks can reside in a given partition, and each of these virtualization stacks can maintain any given number of child partitions.

One reason for having multiple virtualization stacks alongside each other in one partition is that, for example, one virtualization stack 502 could specialize in supporting stripped-down secure partitions while another virtualization stack 503 could specialize in providing full-blown support of all kinds of resources. Naturally, the former virtualization stack 502 would be a lot more secure (and hence so would its partitions) because it would be proportionately less complex than the latter virtualization stack 503. Security and complexity would be trade-offs in this context. Thus, for instance, the latter virtualization stack 503 could provide IDE (Integrated Device Electronics) and SCSI (Small Computer System Interface) support, while the former stripped-down version 502 would not.

Figure 6:
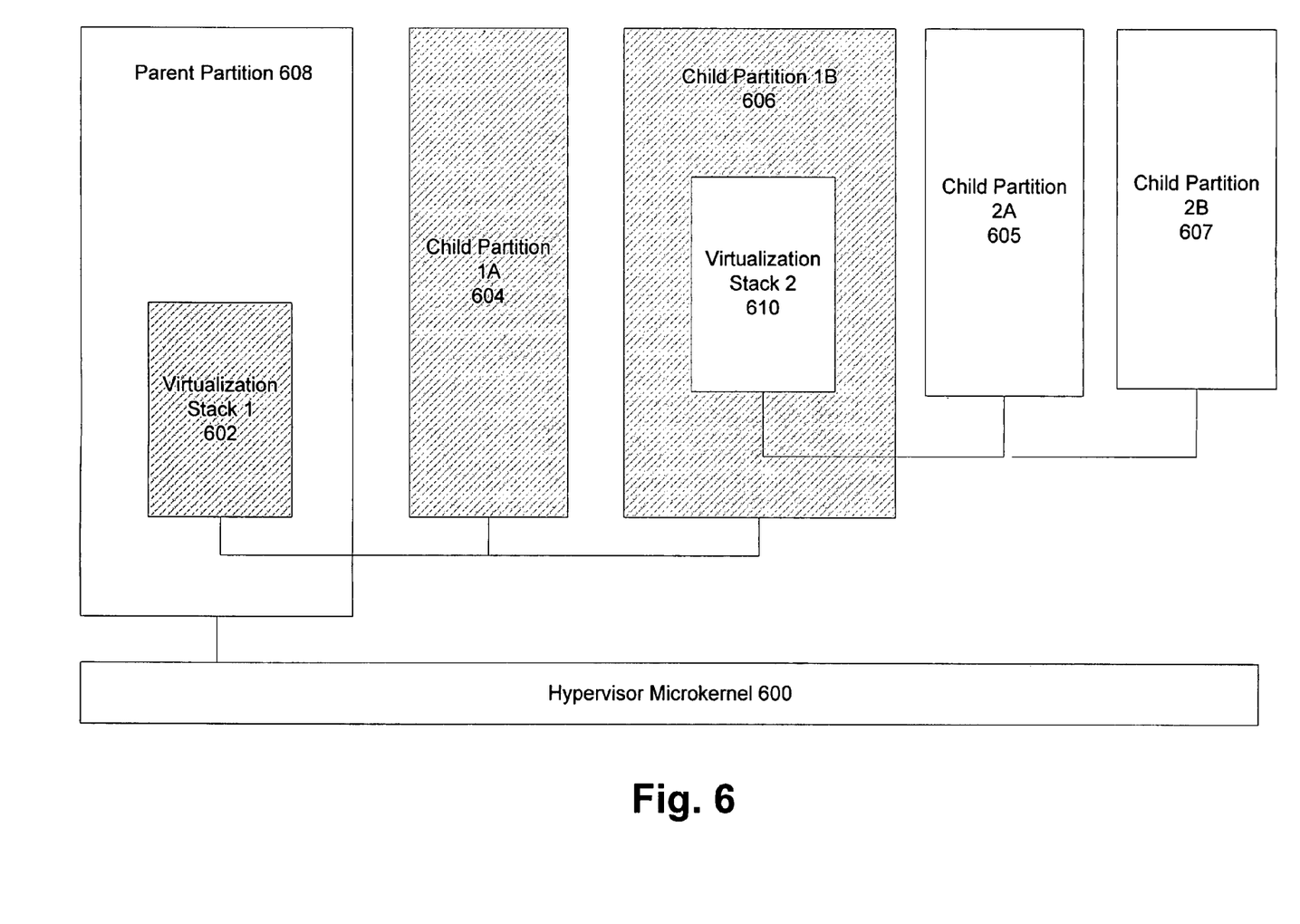
FIG. 6 illustrates the arrangement of virtualization stacks and their corresponding partitions in hierarchical fashion.

In yet another aspect of the disclosure, as is illustrated in FIG. 6, the aforementioned virtualization stacks and their corresponding partitions can be arranged in a hierarchical fashion. Thus, a hypervisor microkernel 600 maintains a parent partition 608, and the corresponding virtualization stack 1 602 to the hypervisor microkernel 600 is located in the parent partition 608. This virtualization stack 1 602 maintain a first child partition 1A 604 and a second child partition 1B 606. A second virtualization stack 2 610 resides in the second child partition 1B 606, and this virtualization stack 2 610 maintain two other child partitions (or grand child partitions with respect to the original partition 608): child partition 2A 605 and child partition 2B 607.

Although it is not so illustrated in FIG. 6, it is understood that each of the child partitions 605 and 607 maintained by the second virtualization stack 2 610 could in turn maintain one or more tertiary virtualization stacks, and these stacks in turn could maintain further child partitions. In short, FIG. 6 attempts to illustrate the notion that the hypervisor microkernel-cum-virtualization stack architecture allows for hierarchical virtualization. Partitions can hold multiple virtualization stacks and such virtualization stacks can maintain multiple partitions, and such multiple partitions can maintain further virtualization stacks, and so on.

One benefit of this type of hierarchical arrangement is that it supports multi-level administration of large machines. For example, a "machine administrator" can control the virtualization stack within a "root partition" (i.e. the top-most parent partition). This administrator can then create sub-partitions that have virtualization stacks of their own and assign each of these a set of machine resources (memory, processors, NICs, disk drives, and so on). This administrator can then allow other administrators (e.g. team-level administrators) to further partition the resources they were assigned. In such a scenario, the second-level virtualization stack is constrained to use the resources provided by the first-level (i.e. root-level) virtualization stack, but then those assigned resources can be used in any way fit. A virtual machine management system that knows about the hierarchy can present it as such, allowing an administrator at each level to reallocate resources among the partitions they control.

This kind of hierarchical scenario should be distinguished from the nested scenario discussed with reference to FIG. 3. Unlike in the nested case that has multiple hypervisors running in nested partitions, where each hypervisor is not aware of base partitions (below it) or derivative partitions (above it), in the hierarchical scenario there is a single hypervisor that is aware of all the partitions. In this case, the multiple virtualization stacks allow for the creation of various hierarchical relationships between partitions. Interestingly, unlike anything that came before, the present hypervisor can directly communicate (i.e. obviating the need to go through any other hypervisors or virtualization software) with any partition even when such partitions are maintained in a hierarchical relationship by the various corresponding virtualization stacks. Such direct communication can be accomplished through direct hypercalls from the hypervisor to any given partition.

Microkernelized Hypervisor and Virtualization Services

Figure 7:
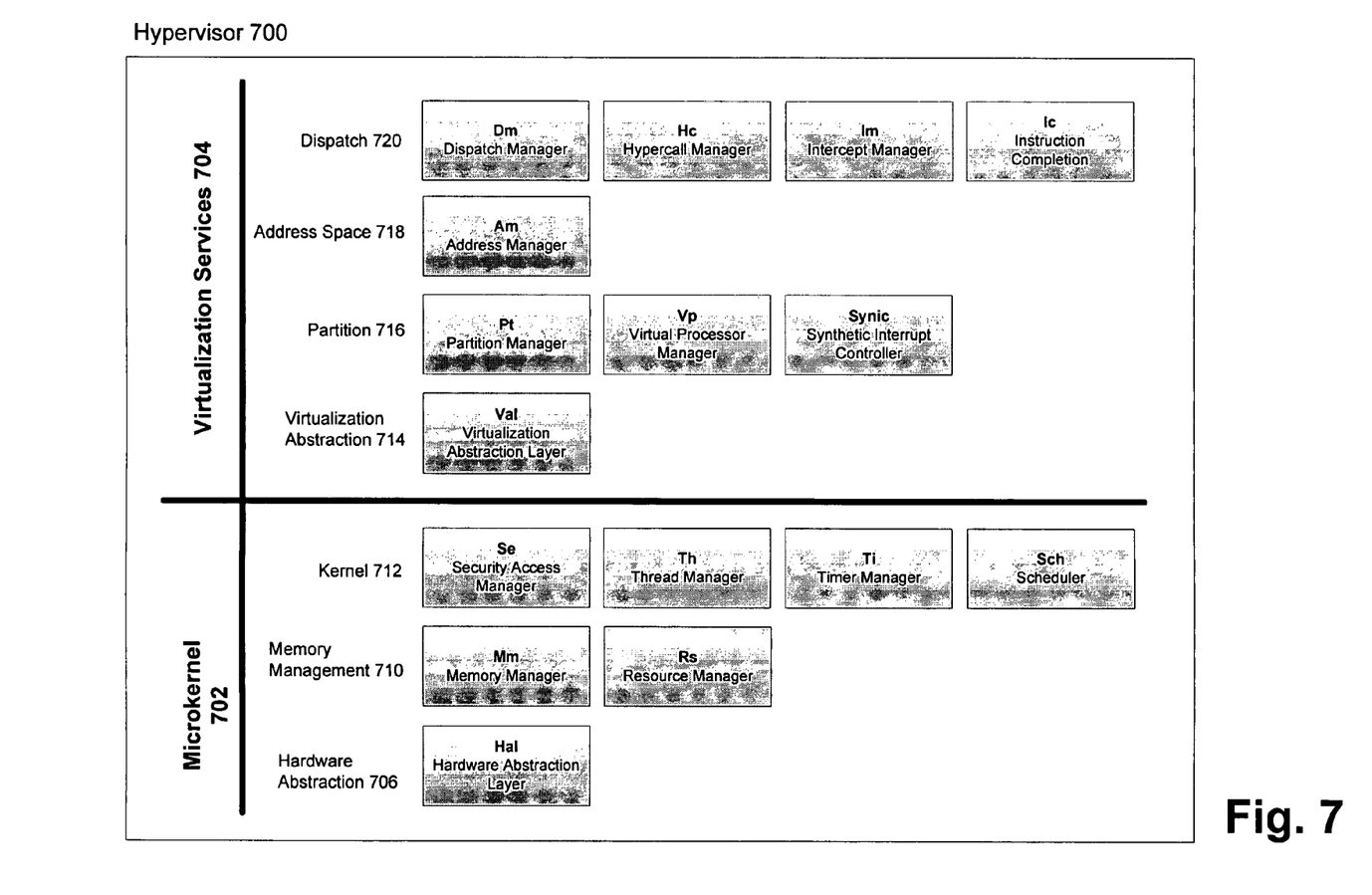
FIG. 7 illustrates the relationship between a hypervisor microkernel and a virtualization stack that provides virtualization services for hierarchical virtualization.

As mentioned above, hierarchical virtualization is supported by the microkernelized hypervisor-cum-virtualization stack architecture. FIG. 7 focuses on hypervisor components which includes the hypervisor microkernel 702 and virtualization services 704 within the hypervisor (FIG. 8, below, focuses on the virtualization stack architecture).

With specific reference to FIG. 7, in the microkernel 702, the bottom-most layer is the hardware abstraction layer 706 and it is responsible for abstracting platform-specific aspects of the microkernel 702. Other modules within this layer and the layer discussed below may be employed, as those skilled in the art will readily appreciate. These layers and modules therein are merely exemplary, presented here for the sake of discussion—they are not limiting or dispositive in any way.

On top of this layer is the memory management layer 710. This layer has a memory manager module that provides primitive internal memory management for the hypervisor 700 and a resource manager module that stores the resource policies for a given CPU and memory usage. Higher-level components are responsible for enforcing these policies.

Finally, the third kernel layer 712 contains at least four exemplary modules: First, a security access manager module manages access right for partitions and resources that can be shared or moved between partitions; second, a thread manager manages threads internal to the hypervisor 700; third, a timer manager manages timer queues and timer interrupts; and fourth, a scheduler implements the hypervisor's 700 scheduler.

Similarly, in the virtualization services 704, four layers may also be used. The first layer is the virtualization abstraction layer 714 and it contains a virtualization abstraction layer module that abstracts the virtualization extensions provided by a processor.

Next, a partition layer 716 contains at least three of the following modules: a partition manager module that manages partition objects and related data structures; a virtual manager processor module that manages one or more virtual processors associated with each partition—in this setup, each virtual processor has its own processor state and runs on its own hypervisor stack; and a synthetic interrupt controller that implements an interrupt controller similar to an x86 advanced programmable interrupt controller.

The next layer concerns the address space. This layer can have an address manager module that manages the definition of a guest's physical address space and its mapping to underlying physical memory resources. Of course, other modules may be used that help to manipulate address space mechanisms and this is just an exemplary module.

Lastly, the virtualization services 704 contains four modules: first, a dispatch manager handles incoming events and dispatches them accordingly; second, a hypercall manager module dispatches hypervisor calls from a guest; third, an intercept manager module handles the dispatching and routing of intercepts (e.g. accesses to model-specific registers, execution of certain instructions, and so on); and fourth, an instruction completion module handles completion of certain instructions during virtualization.

Virtualization Stack Components

Figure 8:
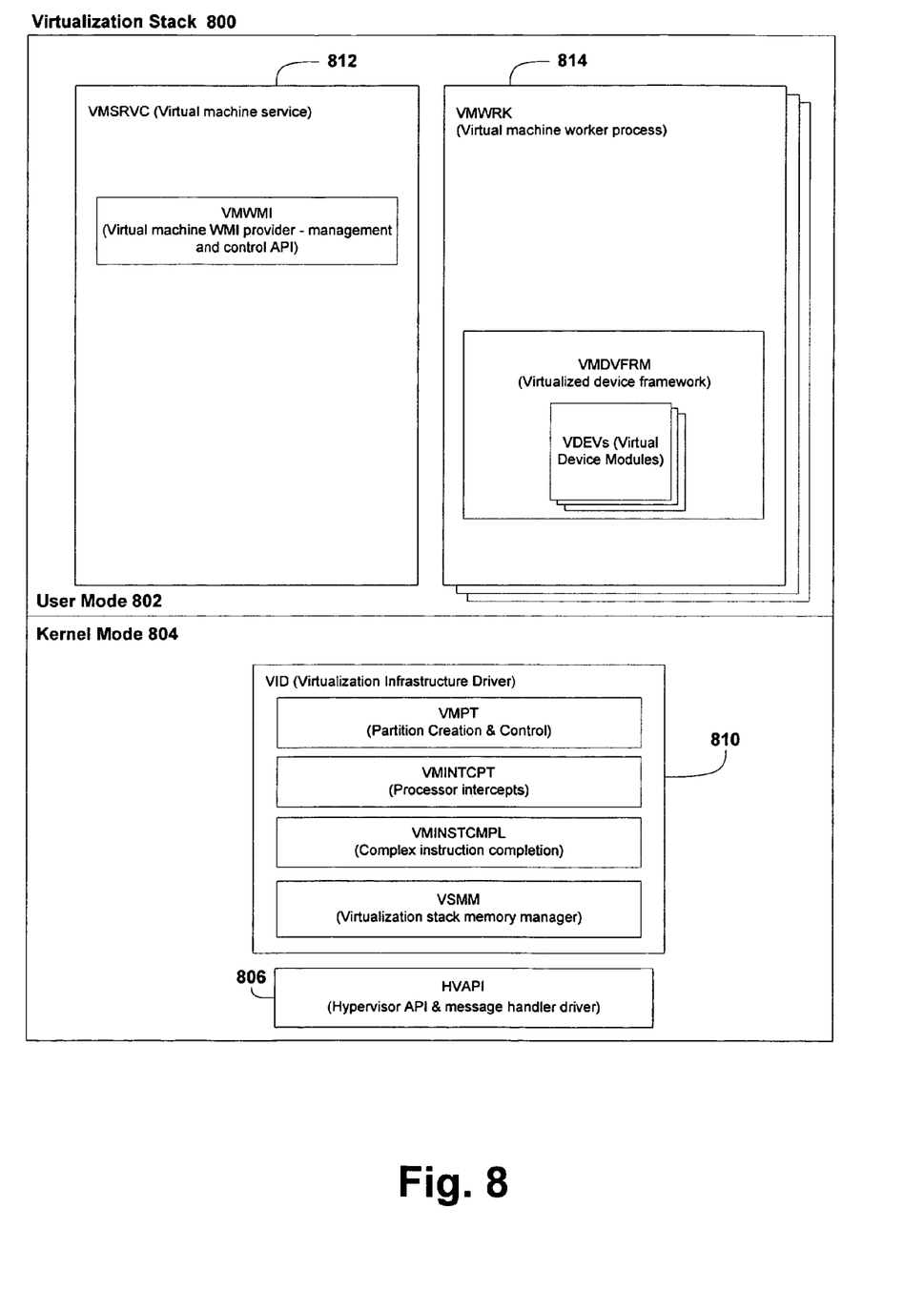
FIG. 8 shows the various components that make up the virtualization stack and their relationship to each other.

In another aspect of the disclosure, FIG. 8 shows the various components that make up the virtualization stack and their relationship to each other. Any related components not disclosed herein can be examined in a related application titled: "SYSTEMS AND METHODS FOR MULTI-LEVEL INTERCEPT PROCESSING IN A VIRTUAL MACHINE ENVIRONMENT," Ser. No. 11/078,141, filed Mar. 11, 2005.

The "external monitor" disclosed in this latter application is a sub-component of the virtualization stack discussed in the present application.

A given virtualization stack 800 can be implemented in user mode 802 and kernel mode 804. Furthermore, the kernel mode 804 can have components such as a hypervisor API and hypervisor message handler library 806 and a virtualization infrastructure driver 810. The user-mode 802 can have components such as a virtual machine service 812 and a virtual machine worker process 814.

Each of these components may have a specifically defined task. For example, the hypervisor API library 806 exposes the hypervisor API to higher-level components, allowing them to call the hypervisor using normal operating system calling conventions. This library can be found in all partitions that contain enlightened code (i.e. code aware of virtualization)—whether or not they host a virtualization stack. Moreover, the hypervisor message handler library 806 allows callers to register kernel-level call-backs for messages received from the hypervisor or from other partitions. Such messages are delivered as inter-partition interrupts with message payloads. This interface allows a single partition to host multiple parallel virtualization stacks. For example, a third party could implement a virtualization stack that resides in the same parent partition as the original-party virtualization stack. Or multiple versions of the original-party virtualization stack could run side by side.

Next, the Virtualization Infrastructure Driver (VID) 810 encapsulates the bulk of the virtualization stack's kernel-mode functionality. It contains several subcomponents. For example, it contains the Virtualization Stack Memory Manager. This subcomponent is responsible for managing a pool of system physical pages that are "owned" by the virtualization stack and used to back the guest physical memory of the child partitions managed by that virtualization stack. This sub-component supports memory over-commit and cross-partition page sharing (for pages with identical contents). It also exposes a set of interfaces that allow user-mode components to define the layout of a virtual machine's guest physical address (GPA) space and to place read & write intercepts on page ranges (e.g. for use during snapshotting or live migration).

Furthermore, the VID 810 also contains Complex Instruction Completion. This subcomponent is able to perform the interpretation of complex instructions that touch memory and are not handled directly by the hypervisor. This support is required for certain device emulation scenarios (e.g. accesses to planar VGA memory, writes to ROM, or accesses to memory-mapped registers of an emulated device).

The VID 810 also contains Processor Intercepts. This sub-component allows user-mode components to specify virtual processor intercepts. For example, an emulated device module may want to receive an intercept notification when a particular I/O port range is accessed via an IN or OUT instruction. Other examples of processor intercepts include: MSR access, CPUID, exceptions, and HLT. This component tracks the installed intercepts and routes the intercept notification as appropriate.

Lastly, the VID 810 may contain Partition Creation & Control subcomponent. This subcomponent allows user-level components to create, delete, and manage partitions and specify partition-wide resources and quotas, defining scheduling and access control policies. For example, the creation of a new partition might be implemented by first making a hypercall to a module within the hypervisor (e.g. HvCreatePartition). Next, one or more virtual processors are created by invoking a hypercall HvCreateVp. Memory is assigned to the guest physical address space of the newly-created partition by invoking another hypercall, e.g. HvMapGpaPages. Intercepts are requested for certain processor action by invoking the hypercall HvInstallIntercept. Various scheduling and security policies are set by invoking the hypercall HvSetPartitionProperty. Initialization code (e.g. an OS loader or a system BIOS) is copied into the memory of the newly-created virtual machine. Execution within the virtual machine begins when a hypercall HvResumePartition is invoked. These hypercalls are merely exemplary and those skilled in the art would appreciate that other and equivalent methods could be implemented to achieve partition creation. Likewise, methods concerning partition deletion (removing virtual processors, guest physical addresses, etc.) are readily appreciated by those skilled in the art, as are methods for managing partition resources.

As mentioned above, the VID 810 and HV API 806 subsist in kernel mode 804. However, other components of the virtualization stack 800 subsist in user mode 802. For example, Virtual Machine Management Service 812 manages a set of VM configurations and exposes a set of WMI-based APIs for managing and controlling VMs. It is responsible for spawning a new VM worker process when a virtual machine is started. This service can be restartable without affecting any of the VM worker processes (making the system more resilient if the service crashes).

Another user-mode 802 component is the Virtual Machine Worker Process 814. Each virtual machine has an associated worker process. If a component within the worker process crashes, the damage can be contained to a single virtual machine. In the Worker Process 814 there is a Virtualized Device Framework. A virtual machine is composed of a set of virtual devices. Each device has its own settings and parameters, many of which can be adjusted by the user. The device framework is responsible for instantiating virtual device modules and "wiring up" these devices to form a functional virtual machine. The devices that make up a virtual machine are defined in a device manifest, part of the VM's configuration file.

Within the aforementioned framework, is the Virtual Device Modules (VDEVs): These plug-in modules contain the logic required to instantiate, initialize, save, restore, reset, and tear down a virtual device. Some virtual devices implement the full emulation of legacy hardware devices. These virtual devices are referred to as emulated device modules and make use of I/O and memory intercepts to respond to guest accesses.

Within the worker process 814 there may also resides a Virtual Machine Creator. This component is responsible for creating and managing a running virtual machine. It handles VM-wide policies, responds to dynamic resource change requests, and is responsible for pausing & resuming, saving & restoring, snapshotting, and live migration of the VM.

While the present disclosure has been described in connection with the preferred aspects, as illustrated in the various figures, it is understood that other similar aspects may be used or modifications and additions may be made to the described aspects for performing the same function of the present disclosure without deviating therefrom. For example, in one aspect of the disclosure, hierarchical virtualization was discussed that was made possible by using a multi-level virtualization mechanism. However, other equivalent mechanisms to these described aspects are also contemplated by the teachings herein. Therefore, the present disclosure should not be limited to any single aspect, but rather construed in breadth and scope in accordance with the appended claims.

The techniques disclosed herein may be implemented via a computer readable medium.

What is claimed:

1. A method for providing hierarchical virtualization, comprising:
creating, with a hypervisor microkernel, a first partition, the first partition having a first virtualization stack;
creating, with the first virtualization stack, a second partition;
receiving, by the first virtualization stack and from the second partition, a request to a hypervisor microkernel function of access to a hardware resource of a computer system not able to be provided by the first virtualization stack, the request indicating an access to a memory management function of the hypervisor microkernel; and
providing, by the hypervisor microkernel and to the second partition, access to the hardware resource.

2. The method according to claim 1, further comprising:
receiving, by the hypervisor microkernel, a request to enumerate a resource of the first partition or the second partition; and
enumerating, by the hypervisor microkernel, the resource.

3. The method according to claim 1, further comprising:
communicating directly with the hypervisor microkernel, by the second partition.

4. The method according to claim 1, wherein the second partition contains a second virtualization stack, further comprising:
creating a third partition by the second virtualization stack.

5. The method according to claim 1, wherein the first partition has a second virtualization stack simultaneously with the first partition having the first virtualization stack.

6. The method according to claim 1, further comprising:
creating a third partition, by the first virtualization stack.

7. The method of claim 1, wherein the second partition comprises a second virtualization stack, the second virtualization stack not providing access to the hardware resource, and further comprising:
creating, with the second virtualization stack, a third partition;
receiving, by the second virtualization stack and from the third partition, a second request to a hypervisor function of access to the hardware resource;
sending, from the second virtualization stack and to the first virtualization stack, an indication of the second request; and
providing, by the hypervisor microkernel and to the third partition, access to the hardware resource.

8. The method of claim 1, wherein the request to the hypervisor function of access to the hardware resource of the computer system not provided by the first virtualization stack is indicative of transferring a resource from the second partition to another partition or sharing the resource between the second partition and another partition.

9. A system for providing secured hierarchical virtualization, comprising:
a hardware processor; and
a memory communicatively coupled to the hardware processor when the system is operational, the memory bearing processor-executable instructions that, upon execution by the hardware processor, cause the system to at least:
create a first partition with a hypervisor microkernel, the first partition having a first virtualization stack;
create, with the first virtualization stack, a second partition;
receive, by the first partition and from the second partition, a request to a hypervisor microkernel function of access to a hardware resource of the system not able to be provided by the first partition;
send, by the first partition and to the hypervisor microkernel, the request; and
provide, by the hypervisor microkernel and to the second partition, access to the hardware resource.

10. The system according to claim 9, wherein the first virtualization stack provides exclusive access to the hardware resource to the second partition.

11. The system according to claim 9, wherein the memory further bears processor-executable instructions that, upon execution by the hardware processor, cause the system to at least:
validate, by the hypervisor microkernel, that the first virtualization stack has provided access to the hardware resource.

12. The system according to claim 9, wherein the request is made by an operating system kernel within the second partition.

13. The system according to claim 9, wherein the request is made by a driver within the second partition.

14. The system according to claim 9, wherein the request is made to a boot loader within the first partition.

15. A computer readable hardware device storing computer-executable instructions providing hierarchical virtualization, causing a computing device executing said computer-executable instructions to perform operations comprising:
creating a first partition with a hypervisor microkernel, the first partition having a first virtualization stack;
creating, with the first virtualization stack, a second partition;
receiving, by the first partition and from the second partition, a request to a hypervisor microkernel function of access to a hardware resource of a computer system not able to be provided by the first virtualization stack; and
providing, by the hypervisor microkernel and to the second partition, access to the hardware resource.

16. The computer readable hardware device according to claim 15, further bearing computer-executable instructions causing computing device executing said computer-executable instructions to perform operations comprising:
creating a third partition by the first virtualization stack.

17. The computer readable hardware device according to claim 15, wherein the first partition has a second virtualization stack, and further bearing computer-executable instructions causing computing device executing said computer-executable instructions to perform operations comprising:
creating, by the second virtualization stack, a third partition.

18. The computer readable hardware device according to claim 15, wherein the second partition has a second virtualization stack.

19. The computer readable hardware device according to claim 18, further bearing computer-executable instructions causing computing device executing said computer-executable instructions to perform operations comprising:
creating, by the second virtualization stack, a third partition.

20. The computer readable hardware device according to claim 18, wherein the first partition has a second virtualization stack simultaneously with the first partition having the first virtualization stack.

* * * * *